United States Patent [19]
Lou et al.

[11] Patent Number: 5,992,582
[45] Date of Patent: Nov. 30, 1999

[54] ELECTRORHEOLOGICAL ROTARY PURE-SHEAR DAMPING DEVICES

[76] Inventors: Zheng Lou, 1613 Old Salem St.; Robert D. Ervin, 11491 McClumpha Rd., both of Plymouth, Mich. 48170; Frank E. Filisko, 870 N. Dixboro Rd.; Christopher B. Winkler, 65 E. Barton La., both of Ann Arbor, Mich. 48105

[21] Appl. No.: 08/229,928

[22] Filed: Apr. 19, 1994

[51] Int. Cl.$^6$ .................................................. F16F 13/30
[52] U.S. Cl. .................................. 188/267.1; 267/64.15; 267/64.26; 267/140.14; 188/269; 188/322.5; 244/104 FP; 192/21.5
[58] Field of Search ................................. 188/129, 130, 188/267, 269, 266, 268, 378–380, 322.5, 381, 267.1, 276.2; 92/31, 32, 33, 165 PR; 74/574, 89.15, 99 R, 99 A; 244/104 FP; 267/136, 140.11, 140.16, 140.15, 64.15, 64.23, 64.26, 64.27, 140.13, 122, 139; 192/21.5, 58 B, 84 E

[56] References Cited

U.S. PATENT DOCUMENTS 2,575,360  11/1951  Rabinow .
2,661,596  12/1953  Winslow .

(List continued on next page.)

FOREIGN PATENT DOCUMENTS

| 478273 | 4/1992 | European Pat. Off. ................ 188/267 |
| 1304808 | 10/1961 | France ................................... 188/319 |
| 4337135 | 11/1992 | Japan ................................... 188/267 |

OTHER PUBLICATIONS

Coulter, J. P., 1993, "An investigation of electrorheological material based controllable damping devices," *The Fluids Engineering Conference: Electrorheological Flows—1993*, Siginer, D. A., Kim, J. H., and Bajura, R. A., ed., FED–vol. 164, ASME, New York, , pp.pp. 115–127.

Lou, Z., Ervin, R. D., and Filisko, F. E., 1993a, "A preliminary parametric study of electrorheological dampers," *The Fluids Engineering Conference: Electrorheological Flows—1993*, Siginer, D. A., Kim, J. H., and Bajura, R. A., ed., FED–vol. 164, ASME, New York, , pp.pp. 143–156.

Lou, Z., Ervin, R. D., Filisko, F. E., and Winkler, C. B., 1993b, "An electrorheologically controlled semi–active landing gear," SAE Technical Paper Series No. 931403, 1993 SAE Aerospace Atlantic Conference & Exposition, Dayton, Ohio, Apr. 20–23, 1993, SAE, Warrendale, PA.

Carlson, J. D., and Duclos, T. G., 1990, "ER fluid clutches and brakes–fluid property and mechanical design considerations," *Electrorheological Fluids*, Proceedings of the Second International Conference on ER Fluids—1989, Carlson, J. D., Sprecher, A. F., and Conrad, H., ed., Technomic Pub. Co., Inc., Lancaster, pp. 353–367.

(List continued on next page.)

*Primary Examiner*—Douglas C. Butler

[57] ABSTRACT

An electrorheological damping device for reducing translational vibration between two bodies comprises a rotary electrorheological damper and transmission means for converting the translational vibration between the two bodies to the rotary motion of the rotary electrorheological damper. The rotary electrorheological damper includes a stator and a rotor that are coaxially arranged. The stator have a plurality of stator electrodes, and the rotor have a plurality of rotor electrodes. The stator electrodes and the rotor electrodes face each other alternatively within at least one fluid chamber. The fluid chamber is filled with an electrorheological fluid that varies its rheological properties when exposed to an electric field. The electrorheological fluid fills spaces between each pair of the stator and rotor electrodes. The rotary electrorheological damper is able to control the damping torque that resists rotary motion between the stator and the rotor and, thus, the translational vibration between the two bodies. An alternative embodiment integrates a pneumatic spring into the electrorheological damping device to create a compact full suspension system, where the rotary ER damper doubles as a piston inside the cylinder of the pneumatic spring.

2 Claims, 3 Drawing Sheets

U.S. PATENT DOCUMENTS

| | | |
|---|---|---|
| 2,661,825 | 12/1953 | Winslow . |
| 2,663,809 | 12/1953 | Winslow . |
| 2,667,237 | 1/1954 | Rabinow . |
| 2,856,179 | 10/1958 | Hogan . |
| 2,886,151 | 5/1959 | Winslow . |
| 3,240,295 | 3/1966 | Martinek et al. . |
| 3,264,949 | 8/1966 | Dietlin .............................................. 92/31 |
| 3,628,638 | 12/1971 | Curchack ................................. 92/31 X |
| 3,858,863 | 1/1975 | Mazelsky ................................... 267/139 |
| 3,888,436 | 6/1975 | Sealey ............................. 267/64.26 X |
| 3,893,550 | 7/1975 | LaRosa ..................................... 92/31 X |
| 4,133,215 | 1/1979 | Norris et al. ............................. 92/31 X |
| 4,241,814 | 12/1980 | Masclet ..................................... 92/31 X |
| 4,286,693 | 9/1981 | Sulzer ...................................... 188/378 |
| 4,325,535 | 4/1982 | Foster ................................... 92/5 R X |
| 4,711,156 | 12/1987 | Kayyod et al. .............................. 92/31 |
| 4,720,087 | 1/1988 | Duclos et al. ....................... 267/140.1 |
| 4,858,733 | 8/1989 | Noguchi et al. ......................... 188/267 |
| 4,896,754 | 1/1990 | Carlson et al. .......................... 188/267 |
| 4,938,322 | 7/1990 | Sugasawara et al. .................... 188/290 |
| 4,942,947 | 7/1990 | Shtarkman .............................. 188/267 |
| 4,945,779 | 8/1990 | Williams ................................ 92/31 X |
| 4,995,597 | 2/1991 | Hatton ............................. 267/64.26 X |
| 5,000,299 | 3/1991 | Goto et al. ............................... 188/267 |
| 5,014,829 | 5/1991 | Hare, Sr. ................................. 188/267 |
| 5,018,606 | 5/1991 | Carlson ................................... 188/267 |
| 5,029,677 | 7/1991 | Mitsui ..................................... 188/267 |
| 5,100,166 | 3/1992 | Mitsui ..................................... 280/707 |
| 5,134,923 | 8/1992 | Wexler ......................................... 92/31 |
| 5,161,653 | 11/1992 | Hare, Sr. ................................. 188/267 |
| 5,180,145 | 1/1993 | Watanabe et al. ...................... 188/267 |
| 5,257,681 | 11/1993 | Shtarkman et al. .................... 188/267 |
| 5,259,487 | 11/1993 | Petek ....................................... 188/267 |
| 5,366,048 | 11/1994 | Watanabe et al. ...................... 188/267 |

OTHER PUBLICATIONS

Colvin, D. P., and Carlson, J. D., 1990, "Control of a fall safe tether using an ER fluid brake," *Electrorheological Fluids*, Proceedings of the Second International Conference on ER Fluids—1989, Carlson, J. D., Sprecher, A. F., and Conrad, H., ed., Technomic Pub. Co., Inc., Lancaster, pp. 426–436.

Stangroom, J. E., 1990, "Tension control using ER fluids—a case study," *Electrorheological Fluids*, Proceedings of the Second International Conference on ER Fluids—1989, Carlson, J. D., Sprecher, A. F., and Conrad, H., ed., Technomic Pub. Co., Inc. Lancaster, pp. 419–425.

ELECTRORHEOLOGICAL ROTARY PURE-SHEAR DAMPING DEVICES

This invention was made with Government support under DAAE07 92-C-R078 awarded by the United States Army and NAG1-1410 awarded by the National Aeronautics and Space Administration. The Government has certain rights in the invention.

FIELD OF THE INVENTION

This invention relates to rotary damping devices that utilize electrorheological (ER) fluids and provide electronically controllable damping to various vibrations.

BACKGROUND OF THE INVENTION

Damping devices are widely used (e.g., in airplane landing gear, automobile suspension systems, earthquake-proof buildings, and optical tables) to reduce vibration and noise, thus improving comfortableness, prolonging machine lives, increasing production quality, and even avoiding catastrophes. People are developing various dampers that can be electronically-controlled for the sake of improved performance.

There is a family of damping devices that utilizes electrorhoelogical (ER) fluids. When exposed to an electric field, an ER fluid changes its rheological properties, most noticeably its viscosity, with a fast response time. ER damping devices can be classified into flow-mode, mixed-mode, and shear-mode dampers according to the source of damping force. The source of damping force is a flow-induced pressure drop for a flow-mode damper, shearing forces on relatively-shearing surfaces for a shear-mode damper, and a mixture of a pressure drop and shearing forces for a mixed-mode damper.

Among the three modes, the ER flow-mode design is most similar to the design of a traditional shock absorber of a vehicle suspension system except that it replaces the conventional orifice with an ER valve. To achieve the same performance, an ER flow-mode damper is believed to be not as compact and not as efficient as an ER shear-mode damper. To achieve the same ER damping force, an ER mixed-mode damper is believed to be more compact than an ER shear-mode damper. However, the ER mixed-mode damper is believed to be not as effective in control as the ER shear-mode damper.

Shear-mode dampers can be further divided into rotary and translational types, either of which can have its own variations in the way electrodes are arranged. The translational type of shear-mode dampers, for example, can have either a plurality of coaxial cylinders or a plurality of parallel perforated-disk-shaped plates as electrodes. Because of the stroke of the translational motion, not all surface area of the electrodes is engaged to generate damping forces, resulting in an inefficiency in design.

The rotary type of shear-mode dampers can have a plurality of perforated-disk-shaped electrodes arranged along the rotational axis or have a plurality of coaxial cylinders. These dampers are able to rotate in complete circles, and the entire surface area of the electrodes is engaged for the damping force generation. One may call them complete-circle rotary-type shear-mode dampers. A rotary-type shear-mode damper may also consist of a plurality of fan- or blade-shaped (instead of perforated-disk-shaped) electrodes, and the electrodes can rotate less than a complete circle. For the sake of distinction, one may call this kind of dampers incomplete-circle rotary-type shear-mode dampers. With a rotary-type damper, a translation-to-rotation conversion mechanism is needed if the vibration to be damped is translational.

Several ER flow-mode damping devices are disclosed in U.S. Pat. No. 4,720,087, U.S. Pat. No. 4,858,733, U.S. Pat. No. 5,000,299, U.S. Pat. No. 5,029,677, U.S. Pat. No. 5,100,166, U.S. Pat. No. 5,014,829, U.S. Pat. No. 5,161,653, and U.S. Pat. No. 5,259,487. Also disclosed in U.S. Pat. No. 5,029,677 is an ER mixed-mode damping device. They are all different from the present invention, which has a shear-mode design.

A family of rotary damping devices that utilize electrorheological magnetic (ERM), also called magnetorheological (MR), fluids are disclosed in U.S. Pat. No. 4,942,947 and U.S. Pat. No. 5,257,681. They are also different from the present invention. ERM or MR fluids respond to a magnetic field while ER fluids respond to an electric field. ERM or MR dampers need relatively complicated magnetic coils while ER dampers need only simple electrodes. The ERM or MR dampers disclosed in U.S. Pat. No. 4,942,947 and U.S. Pat. No. 5,257,681 have an incomplete-circle rotary mixed-mode design, while the present invention uses a complete-circle rotary shear-mode design.

There are also several known ER full-circle rotary shear-mode damping devices. Carlson and Duclos (Carlson, J. D., and Duclos, T. G., 1990, "ER fluid clutches and brakes-fluid property and mechanical design considerations," *Electrorheological Fluids,* Proceedings of the Second International Conference on ER Fluids-1989, Carlson, J. D., Sprecher, A. F., and Conrad, H., ed., Technomic Pub. Co., Inc., Lancaster, pp.353–367.) disclosed a screwdriver that includes an ER full-circle rotary shear-mode clutch and a magnetic rotation-to-rotation coupling. Stangroom (Stangroom, J. E., 1990, "Tension control using ER fluids—a case study," *Electrorheological Fluids,* Proceedings of the Second International Conference on ER Fluids—1989, Carlson, J. D., Sprecher, A. F., and Conrad, H., ed., Technomic Pub. Co., Inc., Lancaster, pp.419–425.) disclosed a tension control device that includes an ER full-circle rotary shear-mode clutch. Colvin and Carlson (Colvin, D. P., and Carlson, J. D., 1990, "Control of a fall safe tether using an ER fluid brake," *Electrorheological Fluids,* Proceedings of the Second International Conference on ER Fluids-1989, Carlson, J. D., Sprecher, A. F., and Conrad, H., ed., Technomic Pub. Co., Inc., Lancaster, pp.426–436.) disclosed a fall-safe tether that includes an ER full-circle rotary shear-mode clutch. None of the just mentioned ER full-circle rotary shear-mode damping devices is intended/designed to reduce translational vibration, which a vehicle suspension system or aircraft landing gear has to deal with. None of the just mentioned ER full-circle rotary shear-mode damping devices, therefore, has an integrated spring element and the mechanism for the motion conversion between rotation and translation, which are included in the present invention.

SUMMARY OF THE INVENTION

The present invention provides a new and improved family of devices for damping the translational vibration between two bodies. An embodiment of the present invention comprises a rotary electrorheological damper and transmission means for converting the translational vibration between the two bodies to the rotary motion of the rotary electrorheological damper. The rotary electrorheological damper includes a stator and a rotor that are coaxially arranged. The stator have a plurality of stator electrodes, and the rotor have a plurality of rotor electrodes. The stator electrodes and the rotor electrodes face each other alternatively within at least one fluid chamber. The fluid chamber is filled with an electrorheological fluid that varies its rheological properties when exposed to an electric field. The electrorheological fluid fills spaces between each pair of the stator and rotor electrodes. The rotary electrorheological damper is able to control the damping torque that resists rotary motion between the stator and the rotor and, thus, the translational vibration between the two bodies.

An alternative embodiment of the present invention integrates a pneumatic spring into the electrorheological damping device to create a compact full suspension system, where the rotary ER damper doubles as a piston inside the cylinder of the pneumatic spring.

DETAILED DESCRIPTION OF THE PREFERRED EMBODIMENTS

Figure 1:
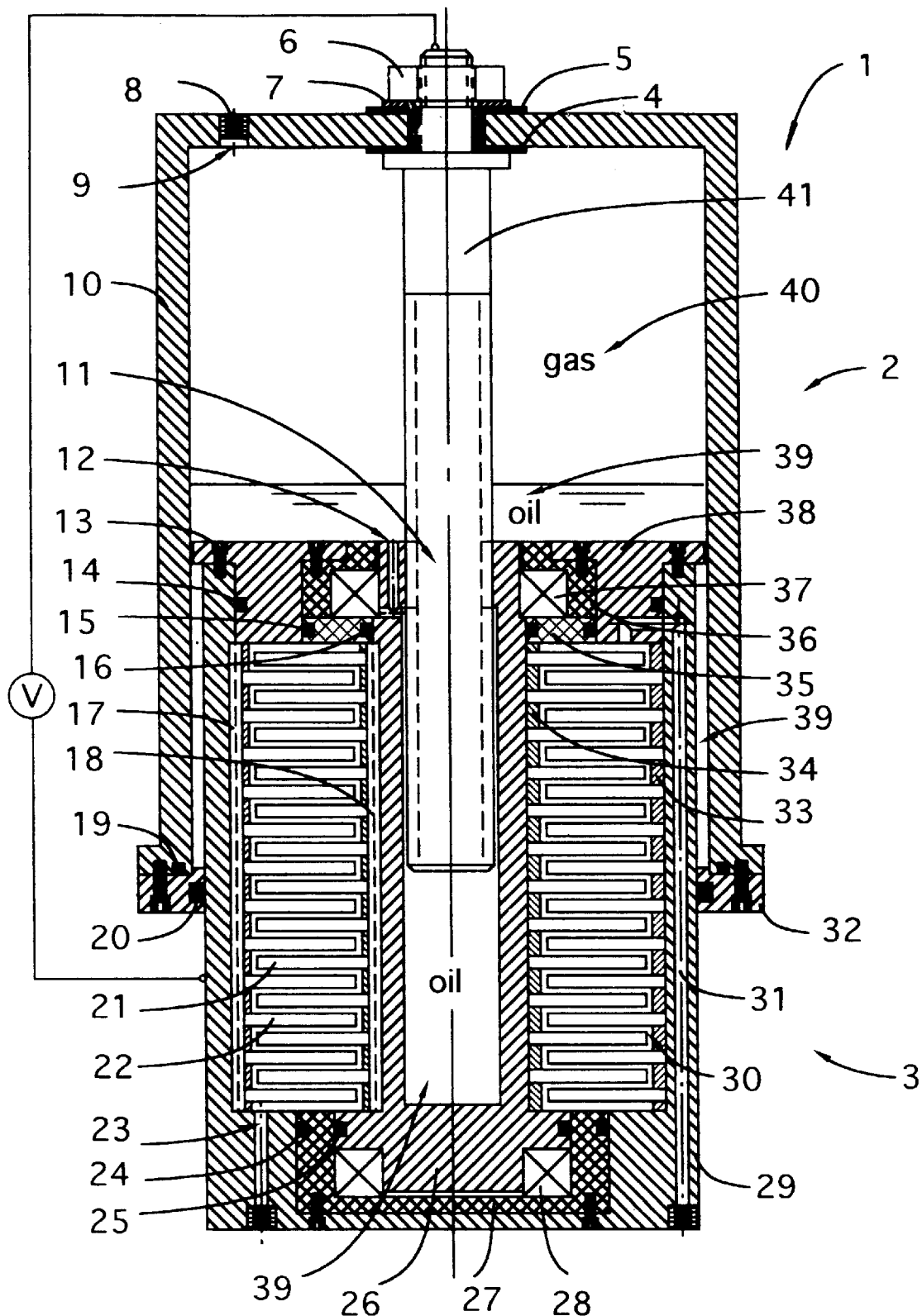
FIG. 1 is a drawing illustrating a preferred embodiment of the present invention. It shows an electrorheological suspension system that includes a pneumatic spring and an electrorheological damper.

Refer now to FIG. 1, which is a drawing of a preferred embodiment of the invention, an electrorheological (ER) suspension system 1. The ER suspension system 1 is a combination of a pneumatic spring 2 on the top and an ER damper 3 at the bottom.

The ER damper 3 includes a stator 29 and a rotor 26, which are coaxially arranged and can rotate relative to each other. Both the stator 29 and the rotor 26 are made of a conductive material. The rotor 26 are mechanically supported within the stator 29 by a pair of bearings 37 and 28 and are electrically insulated from the stator 29 by three insulators 35, 36, and 27. Relative axial movement between the rotor 26 and the stator 29 are not allowed by the bearings 37 and 28.

A plurality of rotor-electrodes 21 are mechanically and electrically connected to the rotor 26 with the help of one or more rotor feather keys 18. A plurality of stator-electrodes 22 are mechanically and electrically connected to the stator 29 with the help of one or more stator feather keys 17. The stator feather keys 17 and the rotor feather keys 18 are electrically conductive. The numbers of the rotor-electrodes 21 and the stator-electrodes 22 may vary from those shown in FIG. 1, and they are selected according to the performance requirements of the ER damper 3. The rotor-electrodes 21 and the stator-electrodes 22 are arranged alternatively, facing each other, along the axis of the ER damper 3 and are separated by an ER fluid 30. The ER fluid 30 fills the entire cavity bordered by the rotor 26 and the stator 29. The ER fluid 30 is a fluid that changes its rheological properties when exposed to an electric field, which exists in between each and every pair of the rotor-electrode 21 and the stator-electrode 22 when they are energized. The ER fluid 30 is fed and bled through top and bottom bleed-holes 31 and 23 during assembly and services.

Spaces between the rotor-electrodes 21 are determined by a plurality of rotor-electrodes spacers 34. Spaces between the stator-electrodes 22 are determined by a plurality of stator-electrodes spacers 33.

The rotor electrodes 21, the stator-electrodes 22, the rotor-electrode spacers 34, and the stator-electrode spacers 33 are perforated-disk-shaped except for small slots (at outer edges of the stator-electrodes 22 and the stator-electrode spacers 33 and at inner edges of the rotor-electrodes 21 and the rotor-electrode spacers 34) that are designed for the stator feather key(s) 17 and the rotor feather key(s) 18 to pass through.

A stator cap 38 is used to support the top bearing 37 and tighten the stator-electrodes 22 and the stator-electrode spacers 33. A disk insulator 35 and a top-bearing insulator 36 are used to electrically insulate the stator cap 38 from the rotor 26 and the top bearing 37. A bottom-bearing insulator 27 is used to electrically insulate the stator 29 from the rotor 26 and the bottom bearing 28.

The rotor-electrodes 21 (through the rotor feather keys 18, the rotor 26, and a shaft 41) and the stator-electrodes 22 (through the stator feather keys 17 and the stator 29) are electrically connected to the opposite polarities of an electric source (V in FIG. 1), respectively. It is not difficult for those skilled in the art to separate electrically the rotor-electrodes 22 and the rotor 26 and wire one of the electric terminals directly to the rotor-electrodes 22, leaving the rotor 26 grounded.

When energized by a stronger electric field, the ER fluid 30 offers more shear resistance to the relative rotation between the rotor-electrodes 21 and the stator-electrodes 22, resulting in a higher damping torque from the ER damper 3.

ER dampers are believed to be more effective when operating at lower shear rates and under less flow inertia influence, which is the theoretical foundation why the shear-mode is selected for the design of the ER damper 3.

The rotary motion of the rotor 26 of the ER damper 3 is converted from the translational motion of a shaft 41 by a screw-nut mechanism 11 (an efficient version of it can be a ball screw-nut mechanism). The shaft 41 and the stator 29 undergo a translational motion relative to each other but no or little, if any, rotation.

The pneumatic spring 2 includes a cylinder 10 and a volume of gas 40. The cylinder 10 is mechanically fixed to the shaft 41 by a shaft nut 6 and a washer 7 and electrically insulated from the shaft 41 by inner and outer shaft-insulators 4 and 5. The relative translational motion between the cylinder 10 and the ER damper 3 induces a volumetric change in the gas 40 and, thus, a variation in the spring force out of the pneumatic spring 2.

As an option, there can exist a certain volume of oil 39 under the gas 40, including a cavity in the center of the rotor 26 and an annular space between the outer wall of the stator 29 and the inner wall of the cylinder 10. The oil 39 can lubricate the screw-nut mechanism 11, function as an additional seal to prevent the gas 40 from entering the ER fluid 30 in the ER damper 3 (it is better in this case for the ER fluid 30 to have the oil 39 as the base or carrier fluid in its composition), work as a heat transfer medium between the cylinder 10 and the ER damper 3. Both gas and oil are charged in and out of the cylinder 10 through a gas/oil charge hole 9.

There is a gap between the stator cap 38 and the cylinder 10 for the oil 39 to flow into and out of the annular space between the outer wall of the stator 29 and the inner wall of the cylinder 10. The oil 39 can also enter or exit the cavity in the center of the rotor 26 through clearances in the screw-nut mechanism 11 and one or more oil passages 12 that are cut through the top of the rotor 26. If so desired, the gap around the stator cap 38 and the oil passages 12 can be design to introduce a certain amount of non-ER damping.

A stopper 32, with its inner diameter being larger than the outer diameter of the stator cap 38, is designed to prevent the ER damper 3 from sliding out of the cylinder 10.

Various seals 14, 15, 16, 19, 20, 24, and 25 are used in the ER suspension system 1. The inner disk seal 16 and the inner bottom seal 25 are used to prevent the ER fluid 30 from leaking through a clearance between two relatively rotating surfaces. Sealing between two moving surfaces in an ER device is always a challenge because most of the contemporary ER fluids contain fine solid particles. It is believed, however, that sealing between two rotating surfaces is much easier than sealing between two sliding surfaces. One of the advantages of this invention is avoiding sliding ER fluid sealing lines. The sliding clearance sealed by the stopper-stator seal 20, by the way, involves only the oil 39, not the ER fluid 30. Also, the rotary-version of the ER shear-mode dampers based on this invention does not experience high hydraulic pressure, which also makes sealing much easier.

Socket screws of various sizes 13 are used in many places to tighten different components. It will not be difficult for those skilled in the art to use other methods to reach the same goal.

Figure 2:
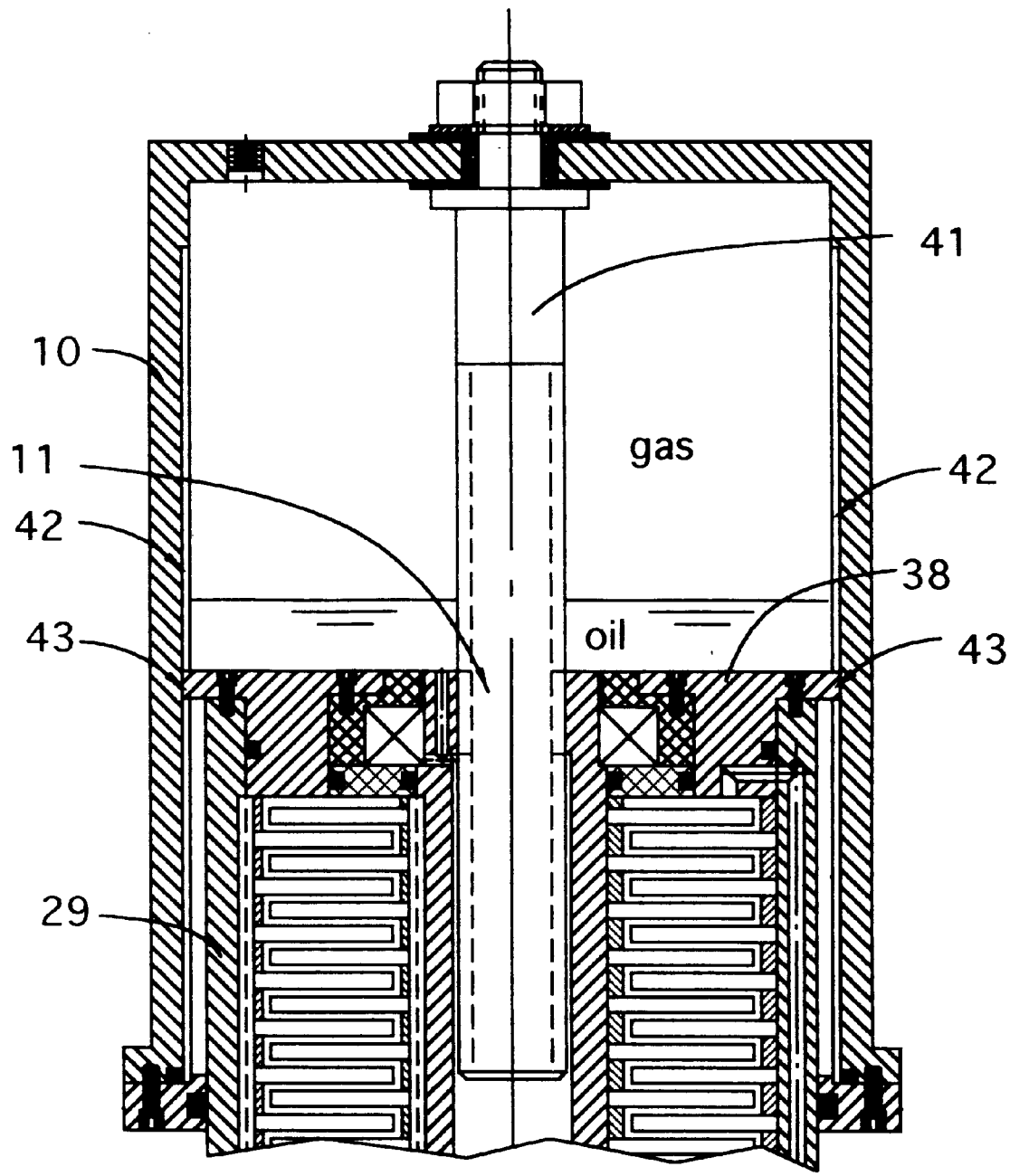
FIG. 2 is a drawing illustrating one of many possible ways of restricting the relative rotation between the cylinder of the pneumatic spring and the stator of the electrorheological damper.

For the ER suspension system 1 in FIG. 1 to be effective, there should not be relative rotation between the shaft 41 (or the cylinder 10) and the stator 29. In many applications, the two bodies to which the shaft 41 (or the cylinder 10) and the stator 29 are attached (e.g., the sprung-mass and unsprung-mass in a vehicle suspension system) are constrained from relative rotation and can withstand the rotational torque. There are applications where such rotation restriction does not exist and must come from the ER suspension system 1 itself. FIG. 2 shows just one of many possible ways of restricting the relative rotation. One or more (two in FIG. 2) anti-rotation slots 42 can be machined into the cylinder 10, and they mate with the same number of anti-rotation keys 43 that are added protruding part of the stator cap 38 to prevent the relative rotation between the stator 29 and the cylinder 10. The anti-rotation keys 43 are free to slide up and down along the anti-rotation slots 42.

Figure 3:
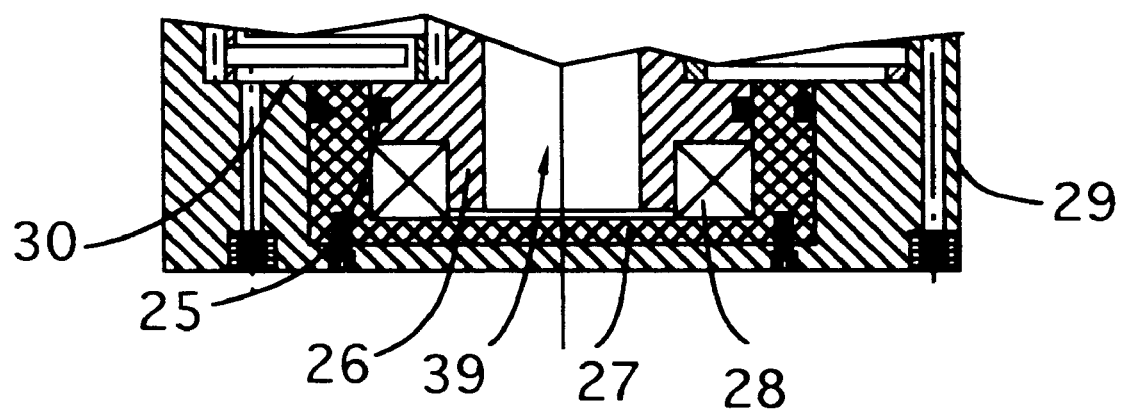
FIG. 3 is a drawing illustrating how the hole in the center of the rotor can be machined through its bottom.

As shown in FIG. 3, the hole in the center of the rotor 26 can be machined through its bottom so that the oil 39 can lubricate the bottom bearing 28. Because the pneumatic spring 2 (shown in FIG. 1) is normally pre-pressurized, the oil 39 can also pressurize the ER fluid 30 by backing-up the seals 15, 16 and 25, preventing the ER fluid 30 from cavitating and leaking.

The above description of the preferred embodiments of the invention has been presented for the purposes of illustration and description. It is not intended to be exhaustive or to limit the invention to the precise forms disclosed. Many modifications, variations, and improvements are possible in light of the foregoing teaching. It is intended that the scope of the invention be limited not by this detailed description, but rather by the claims appended hereto.

We claim:

1. An electrorheological damping device for reducing translational vibration between two bodies, comprising (a) a rotary electrorheological damper, said rotary electrorheological damper comprising a stator and a rotor, said stator and said rotor being coaxially arranged, said stator having a plurality of stator electrodes, said rotor having a plurality of rotor electrodes, a plurality of said stator electrodes and a plurality of said rotor electrodes facing each other alternatively within at least one fluid chamber, said fluid chamber being filled with an electrorheological fluid that varies its rheological properties when exposed to an electric field, said electrorheological fluid filling spaces between each pair of said stator electrode and said rotor electrode, whereby said rotary electrorheological damper being able to control damping torque that resists rotary motion between said stator and said rotor;

(b) a transmission means for converting the translational vibration between said two bodies to the rotary motion between said stator and said rotor; and (c) a pneumatic spring, comprising a gas housing and means for changing the volume of said gas housing according to the translational motion between said two bodies, wherein said gas housing is rigidly connected to a translationally moving component of said transmission means and acts to transmit the pneumatic spring force, wherein said gas housing contains a volume of a lubricant that submerge said transmission means and said rotary electrorheological damper, whereby provide lubrication to said transmission means and protect said electrorheological fluid.

2. The electrorheological damping device of claim 1 wherein said lubricant has the same chemical composition as the fluid of said electrorheological fluid.

\* \* \* \* \*

UNITED STATES PATENT AND TRADEMARK OFFICE
CERTIFICATE OF CORRECTION

PATENT NO. : 5,992,582
DATED : Nov. 30, 1999
INVENTOR(S) : Zheng Lou, Robert D. Ervin, Frank E. Filisko, and Christopher B. Winkler It is certified that error appears in the above-identified patent and that said Letters Patent is hereby corrected as shown below:

Column 6, Line 46 (Claim 2): Instead of "as the fluid of said electrorheological fluid." should have been : "....... as the base or carrier fluid of said electrorheological fluid."

Title page, item [76]: Inventor Zheng Lou's address should have been
11200 Fellows Creek Dr.
Plymouth, MI 48170

Signed and Sealed this

Twentieth Day of February, 2001

Attest:

NICHOLAS P. GODICI

Attesting Officer

Acting Director of the United States Patent and Trademark Office